United States Patent Office 3,072,675
Patented Jan. 8, 1963

---

3,072,675
2-ACYL-OXOPHENOXATHIINS
Stanley J. Strycker, Midland, Mich., assignor to The Dow Chemical Company, Midland, Mich., a corporation of Delaware
No Drawing. Filed May 27, 1960, Ser. No. 32,083
6 Claims. (Cl. 260—327)

This invention is directed to 2-acyl-oxophenoxathiins corresponding to the formula

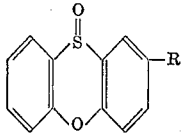

In this and succeeding formulae, R represents alkanoyl, cyclohexyl-lower alkanoyl and phenyl-lower alkanoyl. In the present specification and claims, lower alkanoyl is employed to refer to the alkanoyl radicals containing from 1–5 carbon atoms, inclusive. Representative alkanoyl radicals include those containing up to 18 carbon atoms such as acetyl, 2-methyl-propanol, pentanoyl, dodecanoyl, undecanoyl, tridecanoyl and octadecanoyl. These compounds are crystalline solid materials which are somewhat soluble in many common organic solvents and water. The compounds are useful as parasiticides and are adapted to be employed as active toxicants in compositions for the control of mite, insect and fungal organisms such as ascarids, aphids, beetles, worms, roaches and *Alternaria solani*. The compounds are also useful for the control of the growth of many weed and grass species such as crab grass, coontail, foxtail and cabomba.

The 2-acyl-oxophenoxathiin compounds of the present invention may be prepared by the oxidation of the 2-acyl-phenoxathiins corresponding with the formula

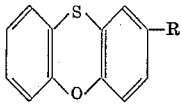

The oxidation of the 2-acyl-phenoxathiin is carried out with hydrogen peroxide and in a liquid reaction medium such as glacial acetic acid, acetone or water. The oxidation takes place readily at temperatures from 0° to 120° C. with the production of the desired product and water of reaction. Good results are obtained when employing substantially equi-molecular proportions of the 2-acylphenoxathiin and hydrogen peroxide. In carrying out the reaction, the hydrogen peroxide is added slowly portionwise with stirring to the 2-acyl-phenoxathiin dispersed in the solvent. Following the addition, the reaction mixture is maintained for a period of time in the reaction temperature range to complete the reaction. Upon completion of the reaction, the desired product may be separated and purified by conventional methods, such as decantation and filtration, washing with water or other organic liquids and recrystallization from various organic solvents.

The following examples merely illustrate the invention and are not to be construed as limiting.

*Example 1.—2-Acetyl-10-Oxophenoxathiin*

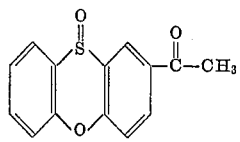

Aqueous 30 percent hydrogen peroxide (equivalent to 4.7 grams; 0.414 mole of $H_2O_2$) was added dropwise over a period of about 15 minutes to 10 grams (0.414 mole) of 2-acetyl-phenoxathiin dispersed in 150 milliliters of glacial acetic acid. The addition was carried out with stirring and at a temperature of 25° C. Stirring was thereafter continued and the reaction mixture raised to a temperature of from 80°–90° C. and maintained thereat for two hours to complete the reaction. The reaction mixture was then diluted with ice water. During the dilution, a 2-acetyl-10-oxophenoxathiin product precipitated therein as a crystalline solid and was separated by filtration. This product was recrystallized from aqueous ethanol and found to melt at 133°–136° C.

*Example 2.—2-Benzoyl-10-Oxophenoxathiin*

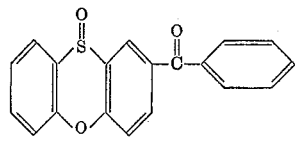

Aqueous 30 percent hydrogen peroxide (equivalent to 2.8 grams; 0.03 mole of $H_2O_2$) was added dropwise to 10 grams (0.03 mole) of 2-benzoyl-phenoxathiin dispersed in 175 milliliters of glacial acetic acid. The addition was carried out over a period of 15 minutes with stirring and at a temperature of 25° C., and the reaction mixture thereafter warmed to 70° C. The mixture was then diluted with ice water to precipitate a 2-benzoyl-10-oxophenoxathiin product as a crystalline solid which was separated by filtration. The separated product was recrystallized from ethanol and found to melt at 172.5° C.–173° C. and have carbon and hydrogen contents of 71.64 percent and 3.72 percent, respectively, as compared to theoretical contents of 71.25 and 3.78 percent.

*Example 3.—2-Hexadecanoyl-10-Oxophenoxathiin*

Aqueous 30 percent hydrogen peroxide (equivalent to 2.83 grams; 0.025 mole of $H_2O_2$) was added dropwise over a period of 15 minutes with stirring and at a temperature of 25° C. to 511 grams (0.02 mole) of 2-hexadecanoyl-phenoxathiin dispersed in 175 milliliters of glacial acetic acid. Stirring was thereafter continued and the reaction mixture warmed to 80° C. and maintained thereat for a period of three hours to complete the reaction. The reaction mixture was then diluted with ice water to precipitate a 2-hexadecanoyl-10-oxophenoxathiin product as a crystalline solid. This product was separated by filtration and recrystallized from aqueous methanol. The recrystallized product melted at 74.5°–77.5° C. and contained carbon and hydrogen contents of 74.07 and 8.28 percent, respectively, as compared to theoretical contents of 73.98 and 8.43 percent.

*Example 4.—2-Hexahydrobenzoyl-10-Oxophenoxathiin*

Aqueous 30 percent hydrogen peroxide (equivalent to 5.7 grams; 0.05 mole of $H_2O_2$) was added dropwise to 15.5 grams (0.05 mole) of 2-hexahydrobenzoyl-phenoxathiin dispersed in 150 milliliters of glacial acetic acid. The addition was carried out over a period of 15 minutes and at a temperature of 25° C. Following the addition, the reaction mixture was warmed to 80° C. and maintained at this temperature for four hours to complete the reaction. The reaction mixture was then diluted with ice water, filtered and the filtrate successively recrystallized from aqueous ethanol to obtain a 2-hexahydrobenzoyl-10-oxophenoxathiin product as a crystalline solid melting at 104°–106° C.

*Example 5.—2-(3-Cyclohexylpropanoyl)-10-Oxophenoxathiin*

Aqueous 30 percent hydrogen peroxide (equivalent to 3.9 grams; 0.034 mole of $H_2O_2$) was added dropwise with stirring to 11.5 grams (0.034 mole) of 2-(3-cyclohexylpropanoyl)-phenoxathiin dispersed in 150 milliliters of glacial acetic acid. The addition was carried out over a period of 15 minutes and at a temeperature of 25° C. Following the addition, the mixture was heated for three hours at the boiling temperature and under reflux to complete the reaction. The mixture was then diluted with ice water, filtered and the filtrate recrystallized from aqueous ethanol to obtain a 2-(3-cyclohexylpropanoyl)-10-oxophenoxathiin product melting at 125°–133° C. This product had carbon and hydrogen contents of 71.03 and 6.09 percent, respectively, as compared to theoretical contents of 71.17 and 6.26 percent.

In a similar manner, other 2-acyl-oxophenoxathiins are prepared as follows:

2-butanoyl-10-oxophenoxathiin by oxidizing 2-butanoyl-phenoxathiin with hydrogen peroxide.

2-(2-cyclohexylacetyl)-10-oxophenoxathiin by oxidizing 2-(2-cyclohexylacetyl)-phenoxathiin with hydrogen peroxide.

2-(2-phenylacetyl)-10 - oxophenoxathiin by oxidizing 2-(2-phenylacetyl)-phenoxathiin with hydrogen peroxide.

2-(3-phenylpropanoyl)-10-oxophenxoathiin by oxidizing 2-(3-phenylpropanoyl)-phenoxathiin with hydrogen peroxide.

2-octanoyl-10-oxophenoxathiin by oxidizing 2-octanoyl-phenoxathiin with hydrogen peroxide.

2-decanoyl-10-oxophenoxathiin by oxidizing 2-decanoyl-phenoxathiin with hydrogen peroxide.

2-(4-cyclohexylpentanoyl)-10-oxophenoxathiin by oxidizing 2-(4-cyclohexylpentanoyl)-phenoxathiin with hydrogen peroxide.

2-(5-phenylpentanoyl)-10-oxophenoxathiin by oxidizing 2-(5-phenylpentanoyl)-phenoxathiin with hydrogen peroxide.

2-tridecanoyl-10-oxophenoxathiin by oxidizing 2-tridecanoyl-phenoxathiin with hydrogen peroxide.

2-octadecanoyl-10-oxophenoxathiin by oxidizing 2-octadecanoyl-phenoxathiin with hydrogen peroxide.

The novel compounds of the present invention are useful as parasiticides for the control of a number of pests and the inhibition of the growth of a number of weed and plant species. For such uses, the products may be dispersed on an inert finely divided solid and employed as dusts. Such mixtures may also be dispersed in water with or without the aid of a surface active agent and employed as sprays. In other procedures, the products may be employed as active constituents in solvent solutions, oil-in-water or water-in-oil emulsions or aqueous dispersions. In representative operations, aqueous compositions containing 1000 parts per million by weight of 2-acetyl-10-oxophenoxathiin give excellent controls of southern army worms, roaches, tampala, foxtail, and coontail.

The 2-acyl-phenoxathiins employed as starting materials in accordance with the teachings of the present application may be prepared by reacting together phenoxathiin and a suitable acid chloride (RCl) in the presence of aluminum chloride as catalyst. Good results are obtained when employing substantially equimolecular proportions of phenoxathiin, acid chloride and catalyst and when carrying out the reaction in a solvent such as 1,1,2,2-tetrachloro-ethane. In carrying out the reaction, the acid chloride conveniently is added portionwise to the mixture of phenoxathiin and catalyst and the resulting mixture maintained for a period of time at a temperature of from about 60°–100° C. to complete the reaction. Following the reaction, the desired products are separated in conventional fashion.

I claim:
1. The 2-acyloxophenoxathiins of the formula

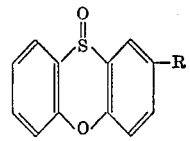

in which R represents a member of the group consisting of cyclohexyl-lower alkanoyl, phenyl-lower alkanoyl and alkanoyl containing up to 18 carbon atoms.

2. 2-acetyl-10-oxophenoxathiin.
3. 2-benzoyl-10-oxophenoxathiin.
4. 2-hexadecanoyl-10-oxophenoxathiin.
5. 2-hexahydrobenzoyl-10-oxophenoxathiin.
6. 2-(3-cyclohexylpropanoyl)-10-oxophenoxathiin.

References Cited in the file of this patent
UNITED STATES PATENTS
2,330,340    Dieter et al. _____ Sept. 28, 1943
2,451,818    Flowers et al. _____ Oct. 19, 1948

OTHER REFERENCES
Suter et al.: Journal of American Chemical Society, volume 58, pages 717–20 (1936).
Deasy: Chemical Reviews, volume 32, pages 175, 184–85 (1943).
Lescot et al.: Journal Chemical Society (London) 1946, pages 2408–11.

UNITED STATES PATENT OFFICE
CERTIFICATE OF CORRECTION

Patent No. 3,072,675

January 8, 1963

Stanley J. Strycker

It is hereby certified that error appears in the above numbered patent requiring correction and that the said Letters Patent should read as corrected below.

Column 1, line 23, for "2-methyl-propanol" read -- 2-methyl-propanoyl --; column 2, line 39, for "511 grams (0.02 mole)" read -- 11 grams (0.025 mole) --.

Signed and sealed this 13th day of August 1963.

SEAL)
ttest:

ERNEST W. SWIDER
ttesting Officer

DAVID L. LADD
Commissioner of Patents